US007174969B2

(12) United States Patent
Droste

(10) Patent No.: US 7,174,969 B2
(45) Date of Patent: Feb. 13, 2007

(54) ROTARY HAMMER

(75) Inventor: Manfred Droste, Limburg-Offheim (DE)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 10/846,249

(22) Filed: May 14, 2004

(65) Prior Publication Data

US 2004/0231866 A1 Nov. 25, 2004

(30) Foreign Application Priority Data

May 14, 2003 (GB) ................................ 0311045.9

(51) Int. Cl.
*B23B 45/02* (2006.01)
*B25D 11/04* (2006.01)

(52) U.S. Cl. ........................................ 173/48; 173/109

(58) Field of Classification Search .................. 173/48, 173/104, 109, 201, 29
See application file for complete search history.

(56) References Cited

U.S. PATENT DOCUMENTS

| | | | | |
|---|---|---|---|---|
| 3,589,488 | A | | 6/1971 | Clements |
| 4,020,935 | A | | 5/1977 | Mortensen |
| 4,418,766 | A | | 12/1983 | Grossman |
| 4,529,044 | A | | 7/1985 | Klueber |
| 4,627,299 | A | | 12/1986 | Mortensen |
| 4,719,976 | A | | 1/1988 | Bleicher et al. |
| 4,732,217 | A | | 3/1988 | Bleicher et al. |
| 4,732,218 | A | | 3/1988 | Neumaier et al. |
| 4,763,733 | A | | 8/1988 | Neumaier |
| 4,895,212 | A | | 1/1990 | Wache |
| 4,998,588 | A | | 3/1991 | Manschitz |
| 5,277,259 | A | | 1/1994 | Schmid et al. |
| 5,320,177 | A | | 6/1994 | Shibata et al. |
| 5,337,835 | A | | 8/1994 | Bohne et al. |
| 5,373,905 | A | | 12/1994 | Bleicher et al. |
| 5,379,848 | A | | 1/1995 | Rauser |
| 5,456,324 | A | | 10/1995 | Takagi et al. |
| 5,842,527 | A | * | 12/1998 | Arakawa et al. .............. 173/48 |
| 6,015,107 | A | | 1/2000 | Lauterwald |
| 6,035,945 | A | * | 3/2000 | Ichijyou et al. ............... 173/48 |
| 6,109,364 | A | * | 8/2000 | Demuth et al. ............... 173/48 |

(Continued)

FOREIGN PATENT DOCUMENTS

| | | |
|---|---|---|
| BE | 868374 | 10/1978 |

(Continued)

*Primary Examiner*—Scott A. Smith
(74) *Attorney, Agent, or Firm*—Michael P. Leary; Charles E. Yocum; Adan Ayala

(57) ABSTRACT

An electrically powered rotary hammer includes a first switchable gear arrangement for actuating the hammering mechanism and a second switchable gear arrangement for actuating the rotary drive mechanism. The hammer includes a mode change knob, a linkage support, a first linkage slideably supported in the linkage support between the mode change knob and the first switchable gear arrangement and a second linkage slideably supported in the linkage support between the mode change knob and the second switchable gear arrangement. The mode change knob moves the linkages between three positions, a drilling only mode position in which the second switchable gear arrangement only is in its actuating position, a hammer drilling mode in which both the first and second gear arrangements are in their actuating positions, and a hammering only mode position in which the first switchable gear arrangement only is in its actuating position.

29 Claims, 5 Drawing Sheets

U.S. PATENT DOCUMENTS

| | | | | |
|---|---|---|---|---|
| 6,142,242 | A | 11/2000 | Okumura et al. | |
| 6,176,321 | B1 * | 1/2001 | Arakawa et al. | 173/48 |
| 6,192,996 | B1 * | 2/2001 | Sakaguchi et al. | 173/48 |
| 6,478,095 | B2 | 11/2002 | Neumaier | |
| 6,510,903 | B2 * | 1/2003 | Funfer | 173/48 |
| 6,520,267 | B2 | 2/2003 | Funfer | |
| 6,550,546 | B2 | 4/2003 | Thurler et al. | |
| 6,557,648 | B2 | 5/2003 | Ichijyou | |
| 6,619,149 | B2 | 9/2003 | Funfer | |
| 6,712,156 | B2 | 3/2004 | Funfer | |
| 6,739,405 | B2 | 5/2004 | Plietsch | |
| 2002/0046847 | A1 | 4/2002 | Ichijyou et al. | |
| 2002/0088627 | A1 | 7/2002 | Plietsch | |
| 2002/0125020 | A1 | 9/2002 | Funfer | |
| 2003/0000066 | A1 | 1/2003 | Phillips | |

FOREIGN PATENT DOCUMENTS

| | | | |
|---|---|---|---|
| BE | 883884 | | 10/1980 |
| CH | 526374 | | 8/1972 |
| CH | 539492 | | 7/1973 |
| CH | 661680 | | 8/1987 |
| DE | 28 25 022 | | 1/1979 |
| DE | 37 32 288 | A1 | 4/1989 |
| DE | 102 61 030 | | 7/2004 |
| EP | 0 145 070 | | 6/1985 |
| EP | 1 369 207 | | 12/2003 |
| EP | 1 422 028 | A1 | 5/2004 |
| GB | 2 121 717 | | 1/1984 |
| GB | 2 324 491 | | 10/1998 |
| JP | 61270086 | | 11/1986 |
| JP | 62264879 | | 11/1987 |
| JP | 3504697 | | 10/1991 |
| JP | 657567 | | 8/1994 |
| JP | 10291173 | | 11/1998 |
| JP | 2002 337023 | | 11/2002 |
| WO | WO 97/21524 | | 6/1997 |

* cited by examiner

ROTARY HAMMER

FIELD OF THE INVENTION

This invention relates to powered rotary hammers, in particular electrically powered rotary hammers having an air cushion hammering mechanism.

BACKGROUND OF THE INVENTION

Such hammers will normally have a housing and a hollow cylindrical spindle mounted in the housing. The spindle allows insertion of the shank of a tool or bit, for example a drill bit or a chisel bit, into the front end thereof so that it is retained in the front end of the spindle with a degree of axial movement. The spindle may be a single cylindrical part or may be made of two or more co-axial cylindrical parts, which together form the hammer spindle. For example, a front part of the spindle may be formed as a separate tool holder body for retaining the tool or bit. Such hammers are provided with an impact mechanism which converts the rotational drive from an electric motor to a reciprocating drive causing a piston, which may be a hollow piston, to reciprocate within the spindle. The piston reciprocatingly drives a ram by means of a closed air cushion located between the piston and the ram. The impacts from the ram are transmitted to the tool or bit of the hammer, optionally via a beatpiece.

Such rotary hammers can also be employed in combination impact and drilling mode or in a drilling only mode in which the spindle, or a forwardmost part of the spindle, and hence the bit inserted therein will be caused to rotate. In the combination impact and drilling mode the bit will be caused to rotate at the same time as the bit receives repeated impacts. A rotary drive mechanism transmits rotary drive from the electric motor to the spindle to cause the spindle, or a forwardmost part thereof to rotate.

Such rotary hammers have a mode change arrangement for switching the hammer between hammer only mode, rotary hammer mode and/or drilling only mode. Preferably, the mode change arrangement is operated by a single mode change knob which is used to switch between all of the modes of the hammer. Because the mode change knob must selectively engage the rotary drive to the spindle and must also selectively engage the hammer drive to the air cushion hammering mechanism, the mode change arrangement may become quite complex. This problem is exacerbated in that the rotary drive and/or the hammer drive can be located within different spaced apart portions of the hammer. Also, it is desirable from an ergonomic point of view to locate the mode change knob towards the rearward end of the gearbox casing of the hammer, so that it is easily reached by an operator of the hammer. The mode change arrangement must withstand a high level of vibration and still accurately switch between modes over the lifetime of the hammer and so a robust design of mode change arrangement is required. Finally, in smaller rotary hammers, in particular those having a wobble plate hammer drive, there are tight space constraints and so the mode change arrangement must be relatively compact.

The present invention aims to provide a rotary hammer with a compact, robust and reliable mode change arrangement for switching between the modes of the hammer.

BRIEF SUMMARY OF THE INVENTION

According to a first aspect of the present invention there is provided an electrically powered rotary hammer comprising a housing; a tool holder located at a forward end of the housing within which a tool or bit can be releasable mounted so as to be rotatingly driven and so as to be able to undergo limited reciprocation; a rotary drive mechanism mounted within the housing for rotatingly driving the tool or bit; a hammering mechanism mounted within the housing for repeatedly impacting the tool or bit; a first switcheable gear arrangement selectively moveable into an actuating position for actuating the hammering mechanism; and a second switchable gear arrangement selectively moveable into an actuating position for actuating the rotary drive mechanism; wherein the hammer additionally comprises a mode change arrangement comprising:

- a mode change knob moveably mounted on the housing;
- a linkage support mounted on the housing;
- a first linkage slideably supported in the linkage support for communication between the mode change knob and the first switchable gear arrangement; and
- a second linkage slideably supported in the linkage support for communication between the mode change knob and the second switchable gear arrangement.
- the mode change arrangement arranged such that movement of the knob moves the linkages between three positions, a drilling only mode position in which the second switchable gear arrangement only is in its actuating position, a hammer drilling mode in which both the first and second gear arrangements are in their actuating position and a hammering only mode position in which the first switchable gear arrangement only is in its actuating position.

The mode change arrangement according to the present invention is reliable and robust. It is also easy to assemble as a sub-assembly of the linkage support and linkages for mounting on the hammer housing. In addition the mode change arrangement can be designed to take up only a very small amount of space within the hammer housing.

The hammer housing may be made of at least two cooperating housing parts so that the linkage support can be mounted on the housing sandwiched between at least two such housing parts. This provides an easy to assemble secure mounting for the linkage support. The linkages may comprise flat plates and the linkage support may be mounted on the hammer housing and the linkages may be supported on the linkage support in such a way that flat faces of the linkages lie substantially parallel to an adjacent wall of the hammer housing. In this way the mode change arrangement according to the present invention can be designed to take up only a small volume within the hammer housing. The linkages may be made of metal so as to have sufficient strength and the linkage support may be made of plastic so that a smooth sliding action is achieved between the linkages and the linkage support.

The first switchable gear arrangement may be biased by a spring arrangement into the actuating position for actuating the hammering mechanism and the first switch linkage may be engageable with the first switchable gear arrangement to move the first switchable gear arrangement against the biasing force of the spring arrangement when the mode change knob is in the drilling only mode position. In this way a smooth transition is achieved into a hammering mode position from the drilling only mode position. The first switch linkage may be engageable with the first switchable gear arrangement to pull the first switchable gear arrangement against the biasing force of the spring arrangement.

The second switcheable gear arrangement may be biased by a spring arrangement into the actuating position for actuating the rotary drive mechanism and the second switch linkage may be engageable with the second switchable gear arrangement to move the second switchable gear arrangement against the biasing force of the spring arrangement when the mode change knob is in the hammering only mode position. In this way a smooth transition is achieved into a drilling mode from the hammering only mode. The second switch linkage may be engageable with the second switchable gear arrangement to push the second switchable gear arrangement against the biasing force of the spring arrangement.

Conveniently, the mode change knob may have a pin mounted on it which is engageable with a through hole within each of the linkages so as to slideably move the linkages within the linkage support. In a preferred embodiment the through hole in one of the linkages is a thin slot and the through hole in the other of the linkages is a wider slot, arranged such that any movement of the mode change knob between mode positions causes the pin to engage an edge of the thin slot to move the one of the linkages and such that movement of the knob from one of the hammer only or drilling only mode positions to the hammer drilling mode positions causes the pin to move within the through hole in the other of the linkages but not to engage an edge of the through hole so that no movement of the other of the linkages occurs and such that movement of the mode change knob from the hammer drilling position to the other of the hammer only or drilling only mode positions causes the pin to engage an edge of the wider slot to move the other of the linkages. A spring arrangement may act on the other of the linkages to bias it into the one of the hammer only or drilling only mode positions. The spring arrangement may for example be mounted between and act between the linkage support and the other of the linkages. In one preferred embodiment the one of the linkages is the first linkage and the other of the linkages is the second linkage.

The rotary drive mechanism of the hammer may comprise a spindle which is selectively rotatingly driven by an intermediate shaft via a spindle drive gear which spindle drive gear forms the first switchable gear arrangement and which is selectively moveable into an actuating position in which it transmits rotary drive between the intermediate shaft and the spindle. The spindle drive gear may be slideably but non-rotatably mounted on one of the spindle or the intermediate shaft.

The hammering mechanism of the rotary hammer may comprise a wobble plate hammering mechanism with a wobble sleeve rotatably mounted on an intermediate shaft so as to be selectively rotatingly driven by the intermediate shaft via a mode change ring which mode change ring forms the second switchable gear arrangement and which is selectively moveable into an actuating position in which it transmits rotary drive between the intermediate shaft and the wobble sleeve. The mode change ring may be slideably and non-rotatably mounted on one of the intermediate shaft or the wobble sleeve.

For an ergonomic design of mode change arrangement which is easily actuated, the mode change knob may be rotatably mounted on the hammer housing so as to be rotatable between mode positions and may have an eccentric pin mounted on it for engaging the linkages so as to slideably move them.

BRIEF DESCRIPTION OF THE DRAWINGS

An embodiment of a rotary hammer according to the present invention will now be described by way of example, with reference to the accompanying drawings in which.

DETAILED DESCRIPTION OF THE INVENTION

Figure 1:
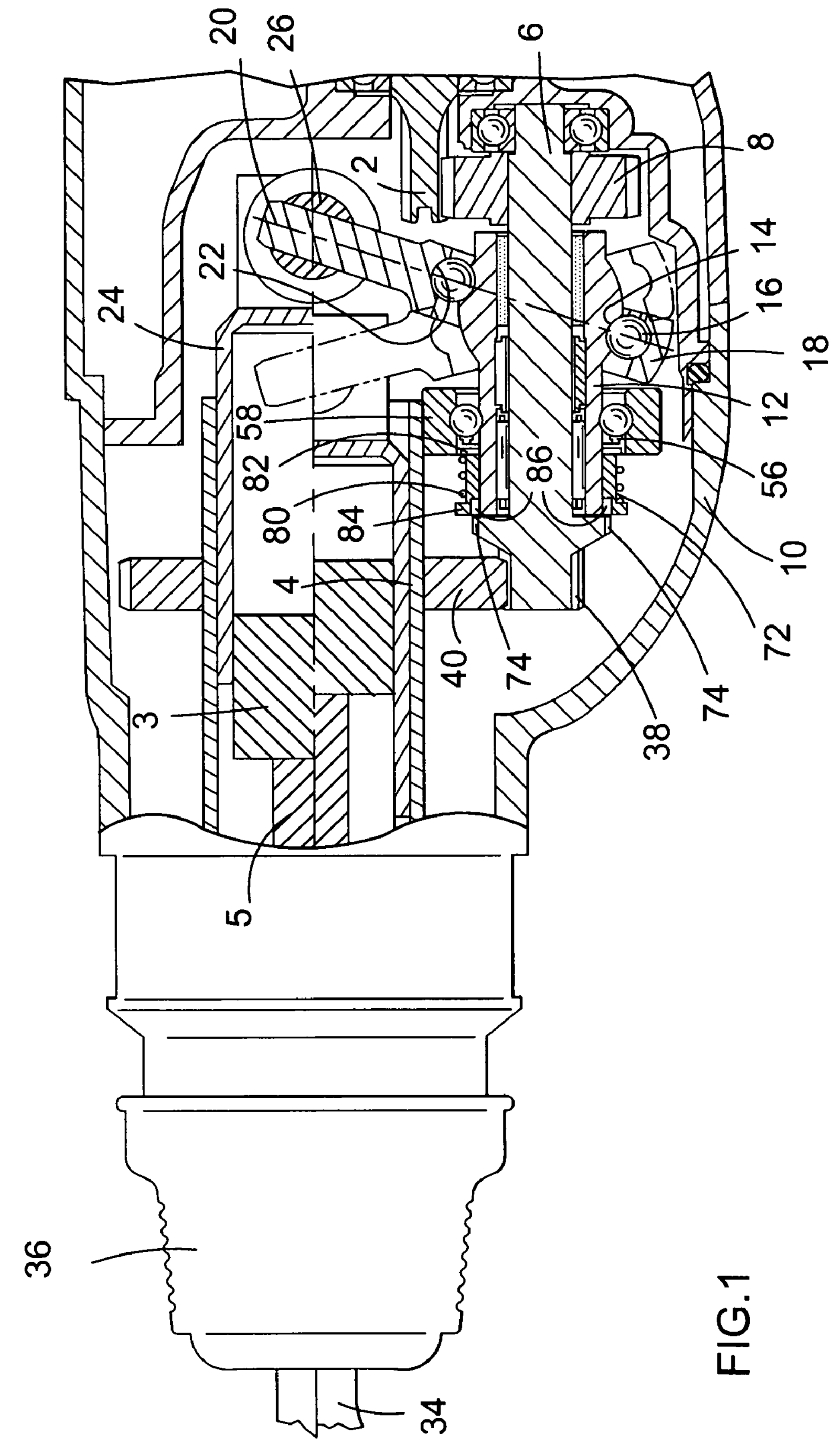
FIG. 1 is a partially cut away side cross-sectional elevation of the forward part of a rotary hammer in the drilling only mode according to the present invention.

The rotary hammer has a forward portion which is shown in FIG. 1 and a rearward portion incorporating a motor and a rear handle, in the conventional way. The handle may be of the pistol grip or D-handle type. The handle portion incorporates a trigger switch for actuating the electric motor, which motor is formed at the forward end of its armature shaft with a pinion (2). The pinion (2) of the motor rotatingly drives an intermediate shaft (6) via a gear (8) which gear is press fit onto the rearward end of the intermediate shaft (6). The intermediate shaft is mounted within a housing part (10) of the hammer, so that it can rotate about its longitudinal axis. In the FIG. 1 arrangement the longitudinal axis of the motor is parallel with the longitudinal axis of the hollow cylindrical spindle (4) of the hammer. Alternatively, the motor could be aligned with its axis, at an angle, for example perpendicular to the axis of the spindle (4), in which case a bevel pinion would be formed at the end of the armature shaft of the motor, to mesh with a bevel gear press fit on the intermediate shaft (6) replacing the gear (8).

A wobble sleeve (12) is mounted on the intermediate shaft (6) using needle bearings, so that it can rotate with respect to the intermediate shaft. The wobble sleeve (12) carries an inner race (14) for ball bearings (16) of a wobble ring (18) from which extends a wobble pin (20). The balls are mounted between the inner race (14) and an outer race (22) formed in the wobble ring (18). Thus, as the wobble sleeve (12) rotates the end of the wobble pin (20) remote from the wobble ring (18) is caused to reciprocate, in order to reciprocatingly drive a hollow cylindrical piston (24). The most rearward position of the wobble pin (20) is shown cross-hatched in FIG. 1 and the most forward position of the wobble pin (20) is shown unshaded in FIG. 1. The end of the wobble pin reciprocatingly drives the piston (24) via a trunnion pin arrangement (26), as is well known in the art.

The hollow cylindrical piston (24) is slideably located within the hollow cylindrical spindle (4). A ram (3) is slideably mounted within the hollow cylindrical piston and an O-ring seal is mounted around the ram so as to seal between the periphery of the ram and the internal surface of the piston. During normal operation of the hammer, a closed air cushion is formed between the interior of the piston and the rearward face of the ram and so the ram is reciprocatingly driven by the piston via the closed air cushion. During normal operation of the hammer the ram repeatedly impacts a beapiece (5), which beatpiece is mounted within the spindle so as to be able to undergo limited reciprocation. The beatpiece transfers impacts from the ram to a tool or bit (34) mounted within a forward tool holder portion of the spindle by a tool holder arrangement (36), for example an SDS-type tool holder. The tool or bit (34) is releasably locked within the tool holder portion of the spindle so as to be able to reciprocate within the tool holder portion of the spindle by a limited amount. In FIG. 1, the ram and beatpiece are shown in their idle mode position in the top half of FIG. 1 and in their operating position in the bottom part of FIG. 1.

The spindle (4) which is rotatingly mounted within the hammer housing (10) can be rotatingly driven by the intermediate shaft (6), as described below. Thus, as well as or instead of reciprocating, the tool or bit (34) can be rotatingly driven because it is non-rotatably mounted within the spindle (4) by the tool holder arrangement (36). Thus, the hammer may have three modes, a drilling only mode in which no hammering occurs and the spindle is rotatingly driven; a hammer drilling mode in which hammering occurs and the spindle is rotatingly driven and a chisel or hammer only mode in which hammering occurs but there is no rotary drive to the spindle and in which the spindle is generally locked against rotation.

The intermediate shaft (6) is formed at its forward end with a pinion (38) which is selectively engageable with a spindle drive gear (40). The spindle drive gear (40) rotationally drives the spindle (4), optionally via a clutch arrangement, as is well known in the art. The spindle drive gear (40) is biased by a spring (48) into a rearward position in which it engages the intermediate shaft pinion (38) and can be moved axially forwardly on the spindle (4), against the force of the spring (48) in order to disengage the intermediate shaft pinion (38). Thus, with the spindle drive gear (40) in a forward position, no rotary drive is transmitted to the spindle (4) and with the spindle drive gear (40) in a rearward position rotary drive is transmitted from the intermediate shaft (6) to the spindle (4) via the intermediate shaft pinion (38) and the spindle drive gear (40).

Figure 2:
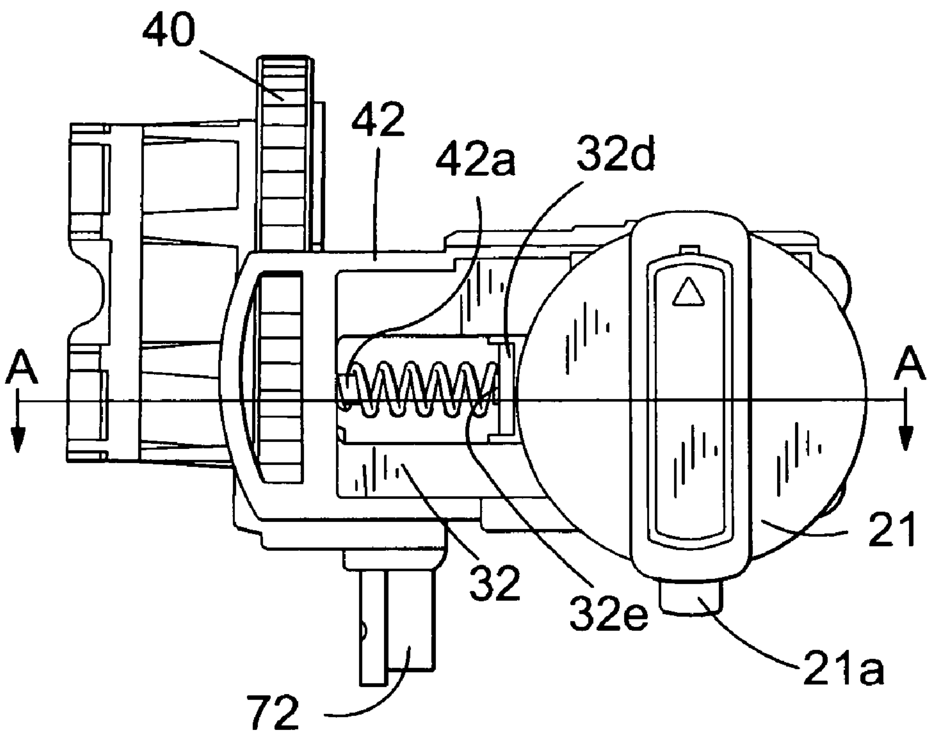
FIG. 2 shows a side view of the mode change mechanism of the hammer of FIG. 1 in the drilling only mode position, with the hammer housing removed.
Figure 3:
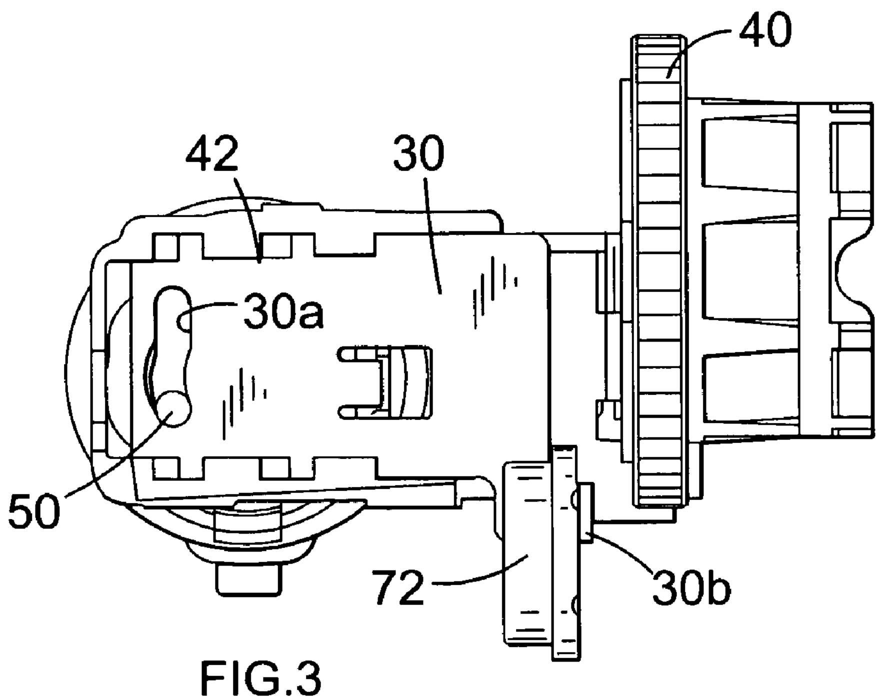
FIG. 3 shows the opposite side view to that shown in FIG. 2.
Figure 4:
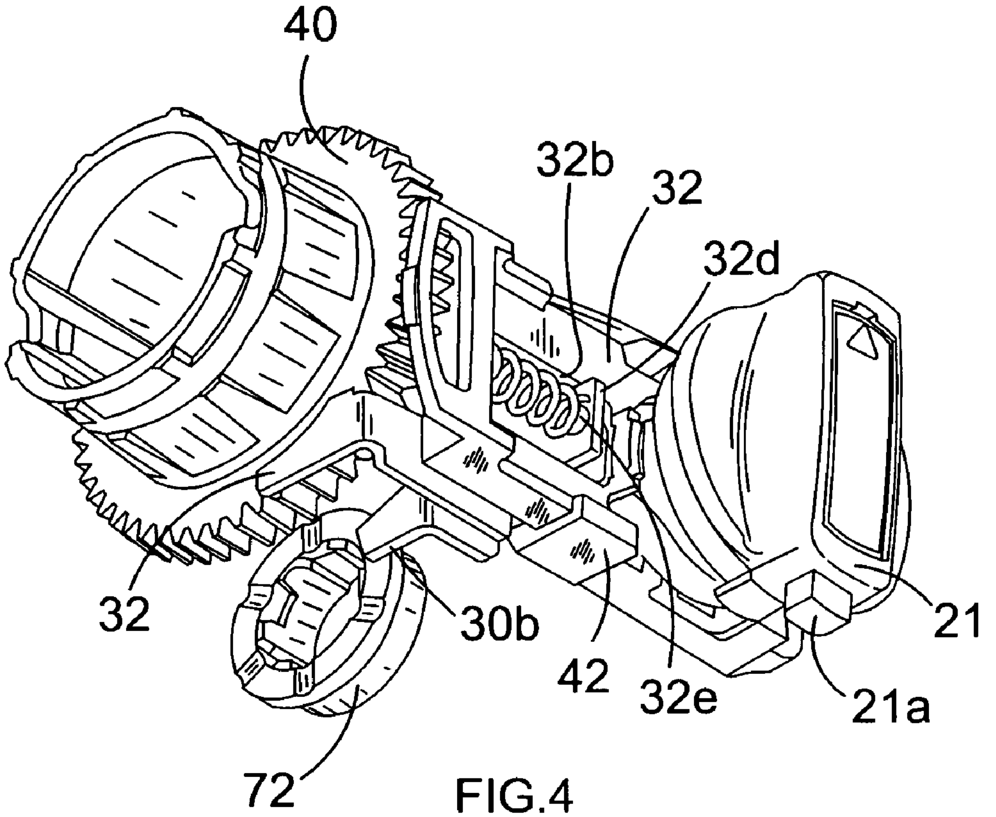
FIG. 4 shows a perspective view of the mode change mechanism of the hammer of FIG. 1 in the drilling only mode position, with the hammer housing removed.
Figure 5:
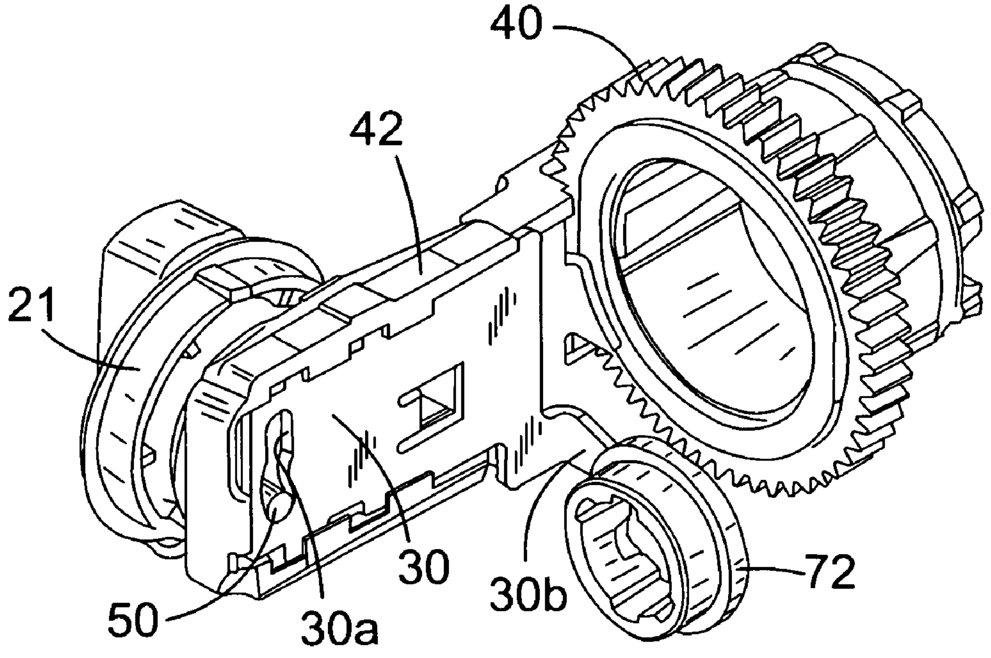
FIG. 5 shows the opposite perspective view to that shown in FIG. 4.

A mode change ring (72) is non-rotatably but axially slideably mounted on the forward portion of the wobble sleeve (12), co-axially with the intermediate shaft (6). The mode change ring is mounted on the wobble sleeve via driven teeth, which take the form of two opposing splines (not shown) formed on the outer surface of the forward end of the wobble sleeve (12). The driven teeth or splines engage in an opposing pair of a plurality of cooperating recesses which are formed in the radially inward facing surface of the mode change ring (72). The recesses extend axially from the forward to the rearward facing face of the mode change ring. The recesses of the mode change ring (72) are selectively engageable with a set of drive teeth (74) formed on an increased outer diameter portion of the intermediate shaft (6). When the mode change ring (72) is in a rearward position, as shown in FIGS. 1 to 3 no rotary drive is transmitted from the intermediate shaft (6) to the wobble sleeve (12) and so no hammering occurs. When the mode change ring (72) moves forwardly into a forward position, the recesses (28) in the mode change ring (72) engage the set of drive teeth (74) formed on the intermediate shaft (6). In the forward position of the mode change ring (72) the recesses (28) in the mode change ring straddle the intermediate shaft drive teeth (74) and the splines on the wobble sleeve (12). Thus, in the forward position of the mode change ring (72) rotary drive is transmitted from the intermediate shaft (6) to the wobble sleeve (12) via the mode change ring (72) and hammering occurs.

A mode change knob (21) is rotated by a user of the rotary hammer to switch between the three positions of the rotary hammer. The first is a drilling only mode position, shown in FIGS. 1 to 6 in which the mode change ring (72) is held in a rearward position against the biasing force of the spring (80) and so does not transmit rotary drive between the intermediate shaft (6) and the wobble sleeve (12) and in which the spindle drive gear (40) is in a rearward position into which it is biased by a spring (48) and so engages the intermediate shaft pinion (38) to rotatingly drive the spindle (4). The second is a hammer drilling mode position, shown in FIG. 7 in which the mode change ring (72) is moved into its forward position by the biasing force of the spring (80) to transmit rotary drive between the intermediate shaft and the wobble sleeve so that hammering occurs and in which the spindle drive gear (40) remains in its rearward position. The third is a chisel or hammer only mode position, shown in FIG. 8 in which the mode change ring remains in its forward position and in which the spindle drive gear (40) is moved forwardly, against the biasing force of the spring (48), out of engagement with the intermediate shaft pinion (38) so no rotary drive is transmitted to the spindle (4).

The mode change knob (21) moves the mode change ring (72) and the spindle drive gear (40) into the required positions via a mode change linkage arrangement comprising two switch plates (30, 32). The two switch plates (30, 32) are made of metal and are longitudinally slideably mounted, with their faces substantially parallel to the adjacent wall of the hammer housing (10) within a linkage support (42), which may be made of a plastic material. The switch plates (30, 32) are mounted so as to be slideable in a fore-aft direction substantially parallel to the longitudinal axis of the spindle (4). The linkage support (42) is fixed on the hammer housing (10) and may be sandwiched between housing portions of the hammer housing (10) which housing portions come together to make the housing (10).

The first switch plate (30) acts between the mode change knob (21) and the mode change ring (72). The first switch plate is formed with a slot (30*a*) at its rearward end which extends substantially perpendicularly to the direction in which the switch plates are slideable. The mode change knob (21) has mounted eccentrically on it a pin (50) which engages within the slot. As the mode change knob (21) is rotated between mode positions, the eccentric pin (50) engages in the slot to slide the first switch plate within the linkage support (42), with the pin being able to move upwardly or downwardly along the slot. The first switch plate (30) is formed, at its end remote from the mode change knob (21) with an arm (30*b*) which is engageable with the mode change ring (72) to pull the mode change ring into its rearward (non hammering) position against the biasing force of the spring (80). The first switch plate (30) is also formed in its central region with a projection (30*c*) which extends in a direction opposite to the arm (30*b*) and which fits through a recess (32*b*) in the second switch plate. The arm (30*b*) and the projection (30*c*) are formed from projections of the metal plate of which the first switch plate (30) is formed, which arms are bent through an angle of around 90° with respect to the remainder of the plate.

The second switch plate (32) acts between the mode change knob (21) and the spindle drive gear (40). The second switch plate is formed with a substantially square shaped through hole (32*a*) at its rearward end which hole extends in a direction substantially perpendicular to the direction in which the switch plates are slideable to the same extent as the slot (30*a*) in the first switch plate and also extends in a direction parallel to the direction in which the switch plates are slideable by a distance just over twice the width of the slot (30*a*). The eccentric pin (50) of the mode change knob (21) extends through the hole (32*a*) in the second switch plate (32) to engage the slot (30*a*) in the first switch plate. As the mode change knob (21) is rotated between mode positions, the eccentric pin (50) engages in the hole (32*a*) to slide the second switch plate within the linkage support (42), with the pin being able to move upwardly or downwardly within the hole. The second switch plate (32) is formed, at its end remote from the mode change knob (21) with an arm (32*c*) which is engageable with the spindle drive gear (40) to push the spindle drive gear into its forward (non drilling) position against the biasing force of the spring (48). The arm (32*c*) is formed from a projection of the metal plate of which the first switch plate (30) is formed, which arm is bent through an angle of around 90° with respect to the remainder of the plate. The second switch plate is formed in its central region with a projection (32*d*) which extends in a direction opposite to the arm (32*c*) and with a second through hole (32*b*) through which the projection (30*c*) of the first switch plate extends. The projection (32*d*) has a forward facing bump (32*e*) formed on it over which is received the rearward end of a guide spring (44). The forward end of the guide spring (44) is mounted over a rearward facing bump (42*a*) formed on the linkage support. In this way the spring (44) biases the second switch plate (32) into a rearward position. The projection (32*d*) and the second through hole (32*b*) are formed by bending a central portion of the second switch pate (32) in a direction opposite to the direction in which the arm (32*c*) extends through an angle of around 90° with respect to the remainder of the plate.

The mode change knob (21) can be rotated into different mode positions. The mode change knob incorporates a latching arrangement operated by slideable lever (21*a*) which enables the mode change knob to be releasably secured in the required mode position.

FIGS. 2 to 6 shown the mode change arrangement in the drilling only mode position, with the spindle drive gear (40) and the mode change ring (72) in the positions shown in FIG. 1, so that no hammering occurs, but rotary drive is transmitted to the spindle. With the mode change knob (21) latched in its drilling only mode position, the eccentric pin (50) of the mode change knob (21) is rotated to a rearwardmost position. Thus, the pin engages the slot (30*a*) in the first switch plate (30) and the hole (32*a*) in the second switch plate (32) to locate both of the switch plates in their rearward positions. In its rearward position the arm (30*b*) of the first switch plate (30) pulls the mode change ring (72) rearwardly against the force of the spring (80) into the position shown in FIG. 1. In its rearward position the arm (32*c*) of the second switch plate (32) abuts the rearward end of the spindle drive gear (40), with the spindle drive gear urged into its rearward position, shown in FIG. 1 by the spring (48). The guide spring (44) is not compressed.

To change the hammer between the drilling only mode and the hammer drilling mode, the mode change knob (21) is moved through 90° in an anti-clockwise direction from the position shown in FIGS. 2 to 6. The mode change knob (21) can then be securely latched in the hammer drilling mode position. This moves the eccentric pin (50) forwardly with respect to the drilling only mode position, into the position shown in FIG. 7. The eccentric pin (50) moves from the bottom end of the slot (30*a*) in the first switch plate (30) (as shown in FIG. 2) to the top end of the slot and at the same time slides the first switch plate, by engagement with the slot forwardly, into the position shown in FIG. 7. As the switch plate (30) slides forwardly, the arm (30*b*) of the switch plate moves forwardly (behind the spindle drive gear (40) in FIG. 7) and disengages the mode change ring (72) which mode change ring (72) moves from its position in FIG. 1 forwardly under the action of the spring (80). If the drive teeth (74) of the intermediate shaft (6) are not aligned with the recesses in the mode change ring (72), the mode change ring (72) cannot immediately move forwardly into the hammering position. However, as soon as the hammer is switched on and the intermediate shaft (6) begins to rotate, the teeth and recesses will come into alignment and the mode change ring (72) will be moved into its forward position by the spring (80). With the mode change ring (72) in its forward position, the mode change ring (72) transmits rotary drive from the intermediate shaft (6) to the wobble sleeve (12) and so hammering occurs. The eccentric pin (50), as it moves from its drilling only position of FIG. 6 to its hammer drilling position of FIG. 7 moves from the bottom edge of the square shaped hole (32*a*) in the second switch plate to the top edge of the hole and moves from the rearward edge of the hole (32*a*) to the forward edge of the hole. Therefore, this movement of the eccentric pin (50) does not cause the position of the second switch plate (32) to change. The second switch plate (32) remains in its rearward position due to the action of the guide spring (44) on the projection (32*d*) of the second switch plate. Therefore, the spindle drive gear (40) is maintained in its rearward position of FIG. 1 by the spring (48) and rotary drive is transmitted to the spindle (4). Accordingly, the hammer drilling mode position is achieved. The projection (30*c*) of the first switch plate moves from the rearward edge of the second hole (32*b*) in the second switch plate to the forward edge of the second hole.

Figure 7:
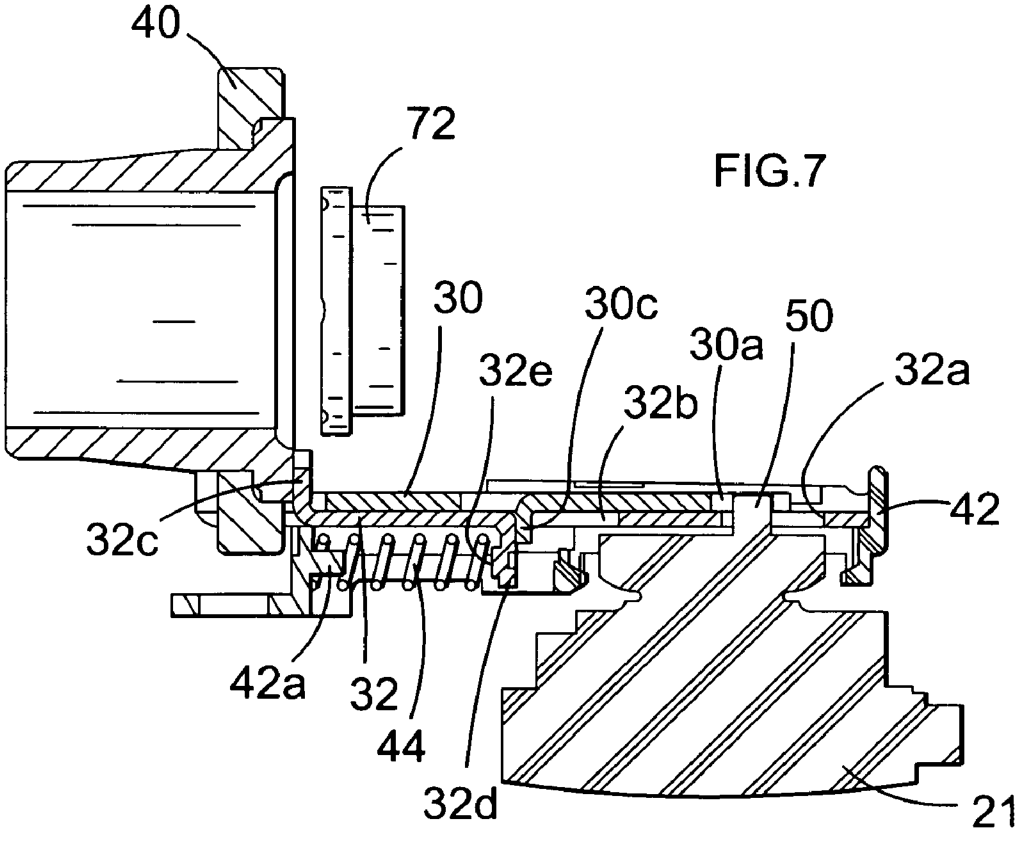
FIG. 7 shows a cross-section similar to that shown in FIG. 6 with the mode change mechanism in the hammer drilling position.
Figure 8:
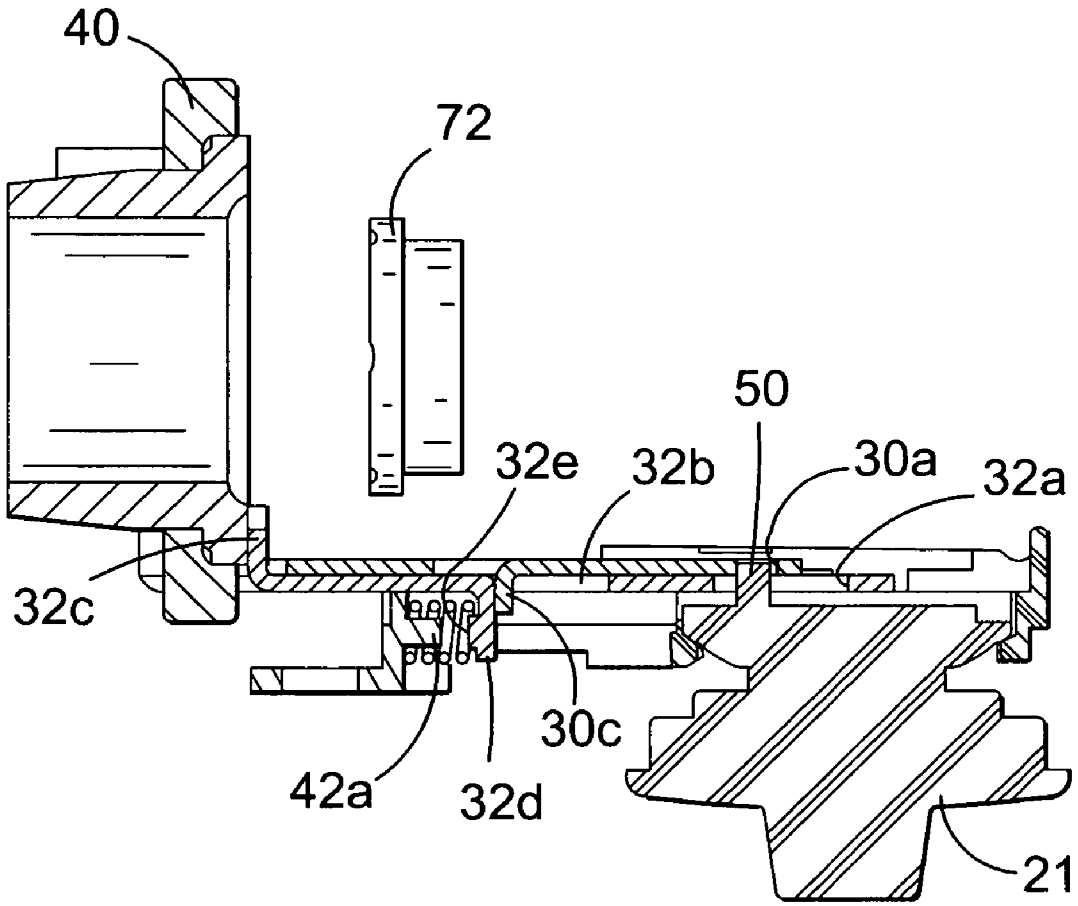
FIG. 8 shows a cross-section similar to that shown in FIGS. 6 and 7 with the mode change mechanism in the hammer only or chisel position.

To change the hammer between the hammer drilling mode and hammer only or chisel mode, the mode change knob (21) is moved through 90° in an anti-clockwise direction from the position shown in FIG. 7. The mode change knob (21) can then be securely latched in the hammer only mode position. This moves the eccentric pin (50) forwardly with respect to the hammer drilling mode position, into the position shown in FIG. 8. The eccentric pin (50) remains at the top end of the slot (30*a*) and slides the first switch plate, by engagement with the slot further forwardly, into the position shown in FIG. 8. As the switch plate (30) slides forwardly, the arm (30*b*) of the switch plate moves further forwardly (behind the spindle drive gear (40) in FIG. 7) and remains disengaged from the mode change ring (72) which mode change ring (72) remains in its forward hammering position under the action of the spring (80). The eccentric pin (50), as it moves from its hammer drilling position of FIG. 7 to its hammer only position of FIG. 8 remains at the top edge of the square shaped hole (32*a*) in the second switch plate and engages the rearward edge of the hole to move the second switch plate (32) forwardly. The first and second switch plates are moved forward together by the action of the eccentric pin (50) with the projection (30*c*) of the first switch plate remaining in abutting engagement with the forward edge of the second hole (32*b*) of the second switch plate. As the switch plates move forwardly, the guide spring (44) is compressed between the projection (32*d*) of the second switch plate and the linkage support (42), as shown in FIG. 8. Also, as shown in FIG. 8, as the second switch plate (32) moves forwardly, the arm (32*c*) of the second switch plate pushes the spindle drive gear (40) forwardly of its position shown in FIG. 1, so that the spindle drive gear (40) becomes disengaged from the intermediate shaft pinion (38) so that the intermediate shaft no longer transmits rotary drive to the spindle drive gear (40) and so the spindle (4) is no longer rotatingly driven. The spindle drive gear may move forwardly into engagement with a spindle lock arrangement which locks the spindle diver gear (40) and thus the spindle (4) against rotation, as is desirable in the hammer only mode. Accordingly, the hammer only mode position is achieved.

To change the hammer between the hammer only mode and hammer drilling mode, the mode change knob (21) is moved through 90° in a clockwise direction from the position shown in FIG. 8 to that shown in FIG. 7. The eccentric pin (50) engages the slot (30*a*) in the first switch plate to move it into its FIG. 7 position, with the arm (30*b*) of the first switch plate still forward of the mode change ring (72) so the mode change ring (72) remains in its forward hammering position. As the eccentric pin (50) of the mode change knob (21) moves rearwardly from the FIG. 8 to the FIG. 7 position, the biasing action of guide spring (44) moves the second switch plate (32) rearwardly. Thus, the spindle drive gear (40) is able to move rearwardly into its FIG. 1 position in which rotary drive is again transmitted to the spindle (4). If the teeth of the spindle drive gear (40) are not aligned with the teeth of the intermediate shaft pinion (38) then the spindle drive gear (40) can not immediately move into its rearward position. However, as soon as the hammer is switched on and the intermediate shaft (6) begins to turn, the spindle drive gear (40) will move into its rearward position under the action of the spring (48) as soon as the teeth become aligned.

Figure 6:
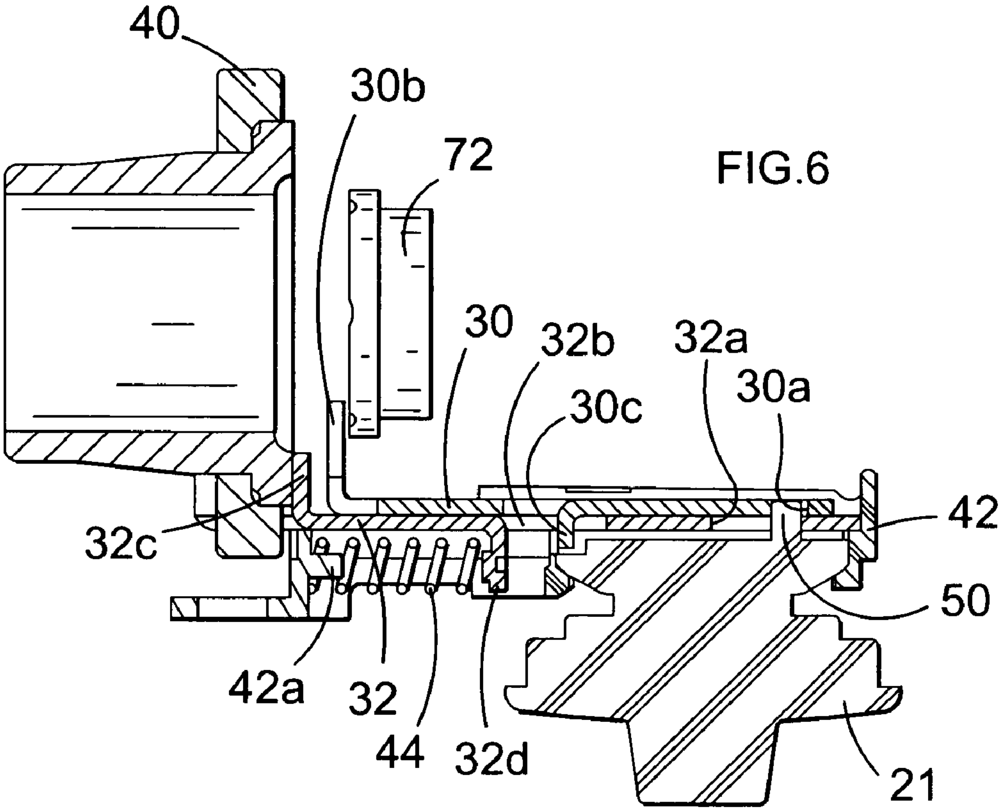
FIG. 6 shows a longitudinal cross-section through line AA of FIG. 2.

To change the hammer between the hammer drilling mode and drilling only mode, the mode change knob (21) is moved through 90° in a clockwise direction from the position shown in FIG. 7 to that shown in FIG. 6. The eccentric pin (50) engages the slot (30*a*) in the first switch plate (30) to move the first switch plate (30) rearwardly and so the arm (30*b*) of the first switch plate pulls the mode change ring (72) into its rearward position of FIG. 1, as shown in FIGS. 2 to 6. Then, hammering is disabled. The eccentric pin (50) also moves from the forward edge of the square hole (32*a*) in the second switch plate (32) to the rearward edge of the square hole and so the second switch plate (32) is not moved and the spindle drive gear (40) remains in its position of FIG. 1 so that rotary drive is transmitted to the spindle (4).

The invention claimed is:

1. An electrically powered rotary hammer comprising a housing (10); a tool holder (36) located at a forward end of the housing within which a tool or bit (34) can be releasable mounted so as to be rotatingly driven and so as to be able to undergo limited reciprocation; a rotary drive mechanism (2, 6, 40, 4, 36) mounted within the housing for rotatingly driving the tool or bit; a hammering mechanism (2, 6, 12, 18, 20, 26, 24, 4, 3, 5) mounted within the housing for repeatedly impacting the tool or bit; a first switchable gear arrangement (72) selectively moveable into an actuating position for actuating the hammering mechanism; and a second switchable gear arrangement (40) selectively moveable into an actuating position for actuating the rotary drive mechanism; wherein the hammer additionally comprises a mode change arrangement comprising:

a mode change knob (21) moveably mounted on the housing;

a linkage support (42) mounted on the housing;

a first linkage (30) slideably supported in the linkage support for communication between the mode change knob (21) and the first switchable gear arrangement (72); and a second linkage (32) slideably supported in the linkage support for communication between the mode change knob (21) and the second switchable gear arrangement (40);

the mode change arrangement arranged such that movement of the knob (21) moves the linkages (30, 32) between three positions, a drilling only mode position in which the second switchable gear arrangement (40) only is in its actuating position, a hammer drilling mode position in which both the first and second gear arrangements (72, 40) are in their actuating position and a hammering only mode position in which the first switchable gear arrangement (72) only is in its actuating position.

2. A rotary hammer according to claim 1 having a housing (10) made of at least two cooperating housing parts wherein the linkage support (42) is mounted on the housing sandwiched between at least two such housing parts.

3. A rotary hammer according to claim 1 or claim 2 wherein the linkages (30, 32) comprise flat plates and the linkage support (42) is mounted on the hammer housing (10) and the linkages are supported on the linkage support in such a way that flat faces of the linkages lie substantially parallel to an adjacent part of the hammer housing.

4. A rotary hammer according to claim 1 and wherein the first linkage and the second linkage are made of metal and the linkage support (42) is made of plastic.

5. A rotary hammer according to claim 1 and wherein the first switchable gear arrangement (72) is biased by a first spring arrangement (80) into the actuating position for actuating the hammering mechanism and the first linkage (30) is engageable with the first switchable gear arrangement to move the first switchable gear arrangement against the biasing force of the spring arrangement when the mode change knob (21) moves into the drilling only mode position.

6. A rotary hammer according to claim 5 wherein the first linkage (30) is engageable with the first switchable gear arrangement (72) to pull the first switchable gear arrangement against the biasing force of the first spring arrangement (80).

7. A rotary hammer according to claim 1 and wherein the second switcheable gear arrangement (40) is biased by a second spring arrangement (48) into the actuating position for actuating the rotary drive mechanism and the second linkage (32) is engageable with the second switchable gear arrangement to move the second switchable gear arrangement against the biasing force of the second spring arrangement when the mode change knob (21) moves into the hammering only mode position.

8. A rotary hammer according to claim 7 wherein the second linkage (32) is engageable with the second switchable gear arrangement (40) to push the second switchable gear arrangement against the biasing force of the second spring arrangement (48).

9. A rotary hammer according to claim 1 and wherein the mode change knob (21) includes a pin (50) which is engageable with at least one of a slot defined by the first linkage and a through hole defined by the second linkage so as to slideable move at least one of the first linkage and the second linkage within the linkage support (42).

10. A rotary hammer according to claim 9 wherein the slot has a first edge and the through hole has a second edge arranged such that movement of the mode change knob (21) between mode positions causes the pin (50) to engage the first edge of the slot to move the first linkage and such that movement of the mode change knob from one of the hammering only mode position and drilling only mode position to the hammer drilling mode position causes the pin to move within the through hole in the second linkage but not to engage the second edge of the through hole so that no movement of the second linkage occurs and movement of the mode change knob from the hammer drilling mode position to one of the hammering only mode position and the drilling only mode position causes the pin to engage the second edge of the through hole to move the second linkage.

11. A rotary hammer according to claim 10 wherein a third spring arrangement (44) acts on the second linkage (32) to bias it into one of the hammering only mode position and the drilling only mode position.

12. A rotary hammer according to claim 11 wherein the third spring arrangement (44) acts between the linkage support (42) and the second linkage (32).

13. A rotary hammer arrangement according to claim 12 wherein the one of the linkages is the first linkage (30) and the other of the linkages is the second linkage (32).

14. A rotary hammer according to claim 1 and wherein the rotary drive mechanism comprises a spindle (4) which is selectively rotatingly driven by an intermediate shaft (6) via a spindle drive gear (40) which spindle drive gear forms the second switchable gear arrangement and which is selectively moveable into the actuating position for actuating the rotary drive mechanism.

15. A rotary hammer according to claim 14 wherein the spindle drive gear (40) is slideably but non-rotatably mounted on one of the spindle (4) and the intermediate shaft (6).

16. A rotary hammer according to claim 1 and wherein the hammering mechanism comprises a wobble plate hammering mechanism (12, 18, 20, 26) with a wobble sleeve (12) rotatably mounted on an intermediate shaft (6) so as to be selectively rotatingly driven by the intermediate shaft via a mode change ring (72) which mode change ring forms the first switchable gear arrangement and which is selectively moveable into the actuating position for actuating the hammering mechanism.

17. A rotary hammer according to claim 16 wherein the mode change ring (72) is slideably and non-rotatably mounted on one of the intermediate shaft (6) and the wobble sleeve (12).

18. A rotary hammer according to claim 1 and wherein the mode change knob (21) is rotatably mounted on the hammer housing (10) and includes an eccentric pin (50) for engaging at least one of the first linkage and the second linkage so as to slideably move at least one of the first linkage and the second linkage.

19. An electrically powered rotary hammer comprising:

a housing;

a motor located in the housing;

a tool holder located at a forward end of the housing for holding a tool bit;

a rotary drive mechanism mounted within the housing and operatively connected between the motor and the tool bit for rotatingly driving the tool bit;

a hammering mechanism mounted within the housing and operatively connected between the motor and the tool bit for repeatedly impacting the tool bit;

a first switchable gear selectively moveable between an engaged position, wherein the hammering mechanism impacts the tool bit, and a disengaged position, wherein the hammering mechanism does not impact the tool bit;

a second switchable gear selectively moveable between a connected position, wherein the rotary drive mechanism rotates the tool bit, and a disconnected position, wherein the rotary drive mechanism does not rotate the tool bit;

a linkage support mounted on the housing;

a first linkage slideably supported in the linkage support and connected to the first switchable gear, the first linkage movable between a first position, wherein the first linkage moves the first switchable gear into the engaged position, and a second position, wherein the first linkage moves the first switchable gear into the disengaged position;

a second linkage slideably supported in the linkage support and connected to the second switchable gear, the second linkage movable between a first position, wherein the second linkage moves the second switchable gear into the connected position, and a second position, wherein the second linkage moves the second switchable gear into the disconnected position; and a mode change knob moveably mounted on the housing and operatively connected to the first linkage and to the second linkage, the mode change knob selectable to one of a hammer mode position, wherein the first linkage is in its first position and the second linkage is in its second position, a drill mode position, wherein the first linkage is in its second position, and the second linkage is in its first position, and a hammer-drill mode position, wherein the first linkage is in its first position and the second linkage is in its first position.

20. A rotary hammer according to claim 19 wherein the first linkage and the second linkage comprise flat plates and the linkage supports the first linkage and the second linkage in substantially planer parallel relation.

21. A rotary hammer according to claim 19 wherein the first linkage and the second linkage are made of metal and the linkage support is made of plastic.

22. A rotary hammer according to claim 19 wherein the hammering mechanism comprises:

a drive shaft rotatably driven by the motor;

a conversion mechanism for converting the rotation of the drive shaft into a reciprocating motion; and a hammer mode change spring having a spring force; and wherein the first switchable gear is biased by the hammer mode change spring into the engaged position, and in the engaged position the first switchable gear drivingly connects the drive shaft to the conversion mechanism for actuating the hammering mechanism, and the first linkage is operatively connected to the first switchable gear to move the first switchable gear against the spring force when the mode change knob moves into the drill mode position.

23. A rotary hammer according to claim 20 wherein the rotary drive mechanism comprises:

a drive shaft rotatably driven by the motor;

an output spindle connected to the toll holder, and a drill mode change spring having a spring force; and wherein the second switchable gear is biased by the drill mode change spring into the connected position, and in the connected position the second switchable gear drivingly connects the drive shaft to the output shaft for actuating the rotary drive mechanism, and the second linkage is operatively connected to the second switchable gear to move the second switchable gear against the spring force when the mode change knob moves into the hammer mode position.

24. A rotary hammer according to Claim 19 and wherein the mode change knob includes a pin engageable with at least one of a slot defined by the first linkage and a through hole defined by the second linkage so as to slideable move at least one of the first linkage and the second linkage within the linkage support.

25. A rotary hammer according to claim 19 and further comprising a spring operatively connected to the mode change switch so as to bias the mode change switch into one of the hammering mode position and the drill mode position.

26. A rotary hammer according to claim 25 wherein the spring is connected between the linkage support and the second linkage.

27. A rotary hammer according to Claim 19 and wherein the rotary drive mechanism comprises: an output spindle connected to the tool holder; and an intermediate shaft including a pinion, and the second switchable gear is a spindle drive gear axially slidably but non-rotatably mounted on the spindle, and in the connected position, the spindle drive gear engages the pinion for transmitting rotary drive from the intermediate shaft to the output spindle.

28. A rotary hammer according to Claim 20 and wherein the hammering mechanism comprises:

an intermediate shaft, a wobble sleeve rotatably mounted around the intermediate shaft; and the first switchable gear is a hammer mode change ring arranged so as to selectably connect the intermediate shaft and the wobble sleeve in driving engagement, when in the engaged position.

29. A rotary hammer according to claim 28 wherein the hammer mode change ring is slideably and non-rotatably mounted on one of the intermediate shaft and the wobble sleeve.

* * * * *